United States Patent
Chang

(10) Patent No.: US 9,270,179 B2
(45) Date of Patent: Feb. 23, 2016

(54) THERMAL BALANCE CONVERSION CIRCUIT

(71) Applicant: HON HAI PRECISION INDUSTRY CO., LTD., New Taipei (TW)

(72) Inventor: Chuan-Sheng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 88 days.

(21) Appl. No.: 14/185,124

(22) Filed: Feb. 20, 2014

(65) Prior Publication Data

US 2014/0333273 A1 Nov. 13, 2014

(30) Foreign Application Priority Data

May 10, 2013 (TW) .............................. 102116602 A

(51) Int. Cl.
*H02M 3/158* (2006.01)
*H03K 17/08* (2006.01)

(52) U.S. Cl.
CPC .... *H02M 3/1584* (2013.01); *H02M 2003/1586* (2013.01)

(58) Field of Classification Search
CPC ... H02M 3/156; H02M 3/158; H02M 3/1584; H02M 2003/1586; H02M 3/1588
USPC .................................. 323/225, 271, 272, 282
See application file for complete search history.

(56) References Cited

U.S. PATENT DOCUMENTS

| | | | | |
|---|---|---|---|---|
| 6,667,606 | B2* | 12/2003 | Oglesbee et al. | 323/284 |
| 7,759,918 | B2 | 7/2010 | Moyer et al. | |
| 8,456,096 | B2* | 6/2013 | Kwok et al. | 315/219 |
| 2002/0044458 | A1 | 4/2002 | Elbanhawy | |

FOREIGN PATENT DOCUMENTS

TW 534375 5/2003

* cited by examiner

*Primary Examiner* — Gary L Laxton
(74) *Attorney, Agent, or Firm* — Novak Druce Connolly Bove + Quigg LLP

(57) ABSTRACT

A thermal balance conversion circuit includes a voltage conversion circuit, a temperature detection circuit, a PWM controller, and a signal integration controller. The voltage conversion circuit includes a plurality of voltage conversion units, and each of the voltage conversion units converts the DC voltage of a external power to a driving voltage. The temperature detection circuit includes a plurality of temperature detection units, and the plurality of temperature detection units detects temperatures of the plurality of voltage conversion units. The pulse width modulation controller outputs a plurality of different phase PWM signals according to each of the voltage conversion units. The signal integrated controller receives the PWM signals from the PWM controller to control the voltage conversion of each of the voltage conversion unit.

10 Claims, 4 Drawing Sheets

THERMAL BALANCE CONVERSION CIRCUIT

BACKGROUND

1. Technical Field

The disclosure relates to thermal balance circuits, and particularly to a multiphase thermal balance conversion circuit.

2. Description of Related Art

In a multiphase power supply, a plurality of voltage conversion return circuits are used to convert voltage. The plurality of voltage conversion return circuits may not meet requirements because of the dissipating heat caused by a change of external environment or circuit layout of a printed circuit board. The one or more voltage conversion return circuits can overheat and damage the elements of the voltage conversion return circuits. Therefore, a multiphase power that can overcome the described limitations is needed.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
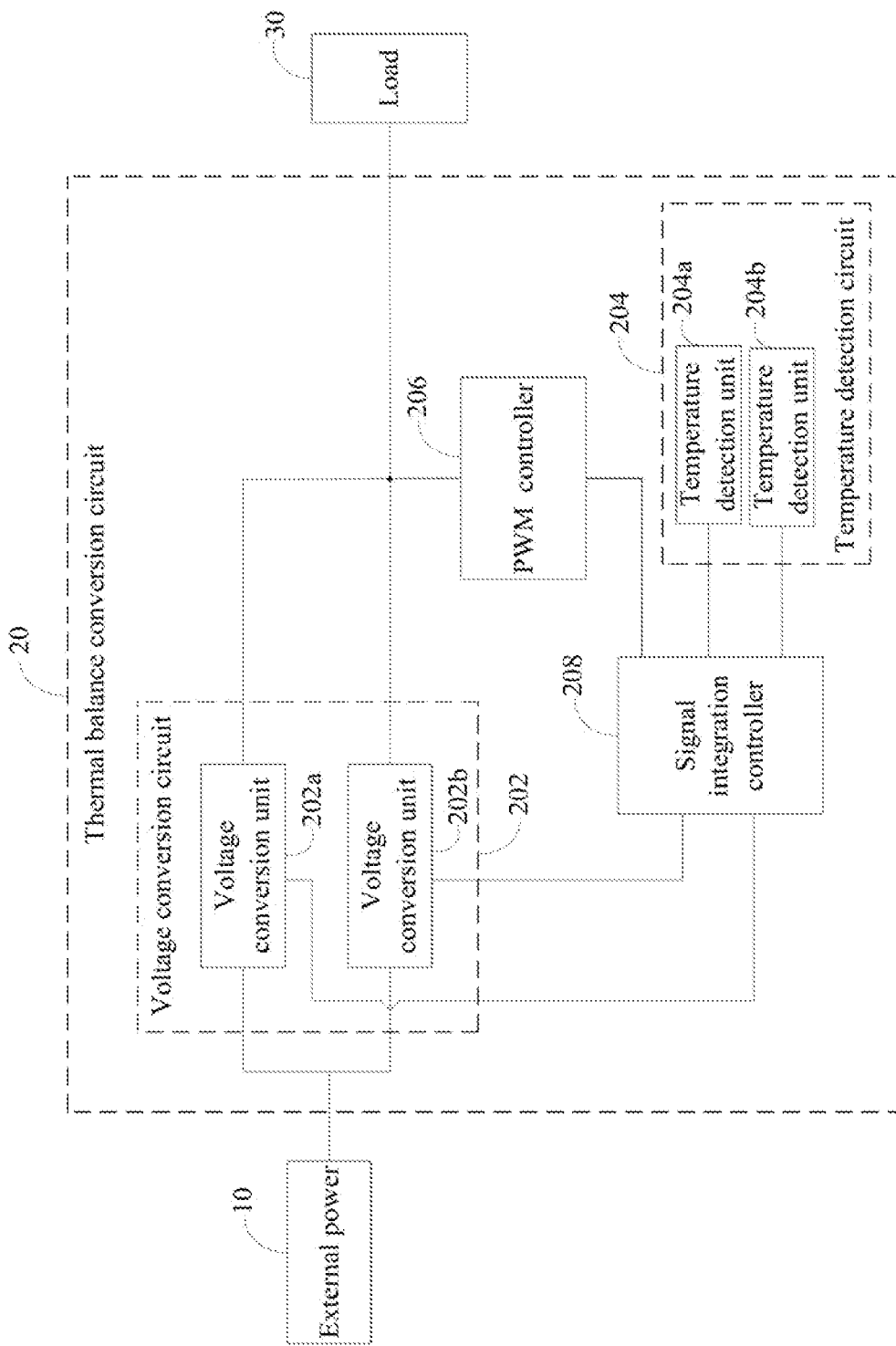
FIG. 1 is a schematic diagram of a first embodiment of a thermal balance conversion circuit according to the present disclosure.

FIG. 1 is a schematic diagram of a first embodiment of a thermal balance conversion circuit 20 according to the present disclosure. In one embodiment, the thermal balance conversion circuit 20 converts a direct current (DC) voltage of an external power 10 to a driving voltage for a load 30. The thermal balance conversion circuit 20 comprises a voltage conversion circuit 202, a temperature detection circuit 204, a pulse width modulation (PWM) controller 206, and a signal integration controller 208.

The voltage conversion circuit 202 is connected between the external power 10 and the load 30. The voltage conversion circuit 202 comprises a plurality of voltage conversion units 202a, 202b (two shown as example). Each of the voltage conversion units 202a, 202b converts the DC voltage of the external power 10 to the driving voltage needed by the load 30, and the driving voltages output by the voltage conversion units 202a, 202b have different phase.

The temperature detection circuit 204 comprises a plurality of temperature detection units 204a, 204b (two shown). Each of the temperature detection units 204a, 204b respectively detects a temperature of each of the voltage conversion units 202a, 202b. The number of the temperature detection units 204a, 204b can be equivalent to the number of the voltage conversion units 202a, 202b.

The PWM controller 206 outputs a plurality of PWM signals PWM1, PWM2, PWM3, PWM4 (four shown) according to each of the voltage conversion units 202a, 202b. The plurality of PWM signals PWM1, PWM2, PWM3, PWM4 have different phase, and the number of the PWM signals PWM1, PWM2, PWM3, PWM4 are twice as the number of the voltage conversion units 202a, 202b.

The signal integration controller 208 is connected to the voltage conversion circuit 202, the temperature detection circuit 204, and the PWM controller 206. The signal integration controller 208 generates temperature detection signals corresponding to each of the voltage conversion units 202a, 202b according to the detected temperature output by each of the temperature detection units 204a, 204b. The signal integration controller 208 compares and finds a maximum value and a minimum value among the plurality of temperature detection signals in a unit cycle, transfers the PWM signals PWM3, PWM4 of the voltage conversion unit 202b corresponding to the maximum value to the PWM signals PWM1, PWM2 of the voltage conversion unit 202a corresponding to the minimum value, and replaces the voltage conversion unit 202b corresponding to the maximum value with the voltage conversion unit 202a corresponding to the minimum value to convert the DC voltage of the external power 10.

In one embodiment, the plurality of voltage conversion units 202a, 202b converts the DC voltage of the external power 10 to the driving voltage according to the plurality of PWM signals PWM1, PWM2, PWM3, PWM4 output by the signal integration controller 208.

The voltage conversion circuit 202 is further connected to the PWM controller 206. The PWM controller 206 adjusts a duty cycle of the plurality of PWM signals PWM1, PWM2, PWM3, PWM4 according to the driving voltage output by each of the voltage conversion units 202a, 202b. The PWM controller 206 sends the plurality of adjusted PWM signals PWM1, PWM2, PWM3, PWM4 to the signal integration controller 208 to adjust the driving voltage output by each of the voltage conversion units 202a, 202b.

The signal integration controller 208 further determines if values of the plurality of temperature detection signals are greater than a predetermined threshold. In response to none of the values of the plurality of temperature detection signals being greater than the predetermined threshold, the signal integration controller 208 transmits the plurality of different phase PWM signals PWM1, PWM2, PWM3, PWM4 to each of the voltage conversion units 202a, 202b. In response to one or more of the values of the plurality of temperature detection signals being greater than the predetermined threshold, the signal integration controller 208 compares and finds the maximum value and the minimum value among the plurality of temperature detection signals, transfers the PWM signals PWM3, PWM4 of the voltage conversion unit 202b corresponding to the maximum value to the PWM signals PWM1, PWM2 of the voltage conversion unit 202a corresponding to the minimum value, and replaces the voltage conversion unit 202b corresponding to the maximum value with the voltage conversion unit 202a corresponding to the minimum value to convert the DC voltage.

Figure 2:
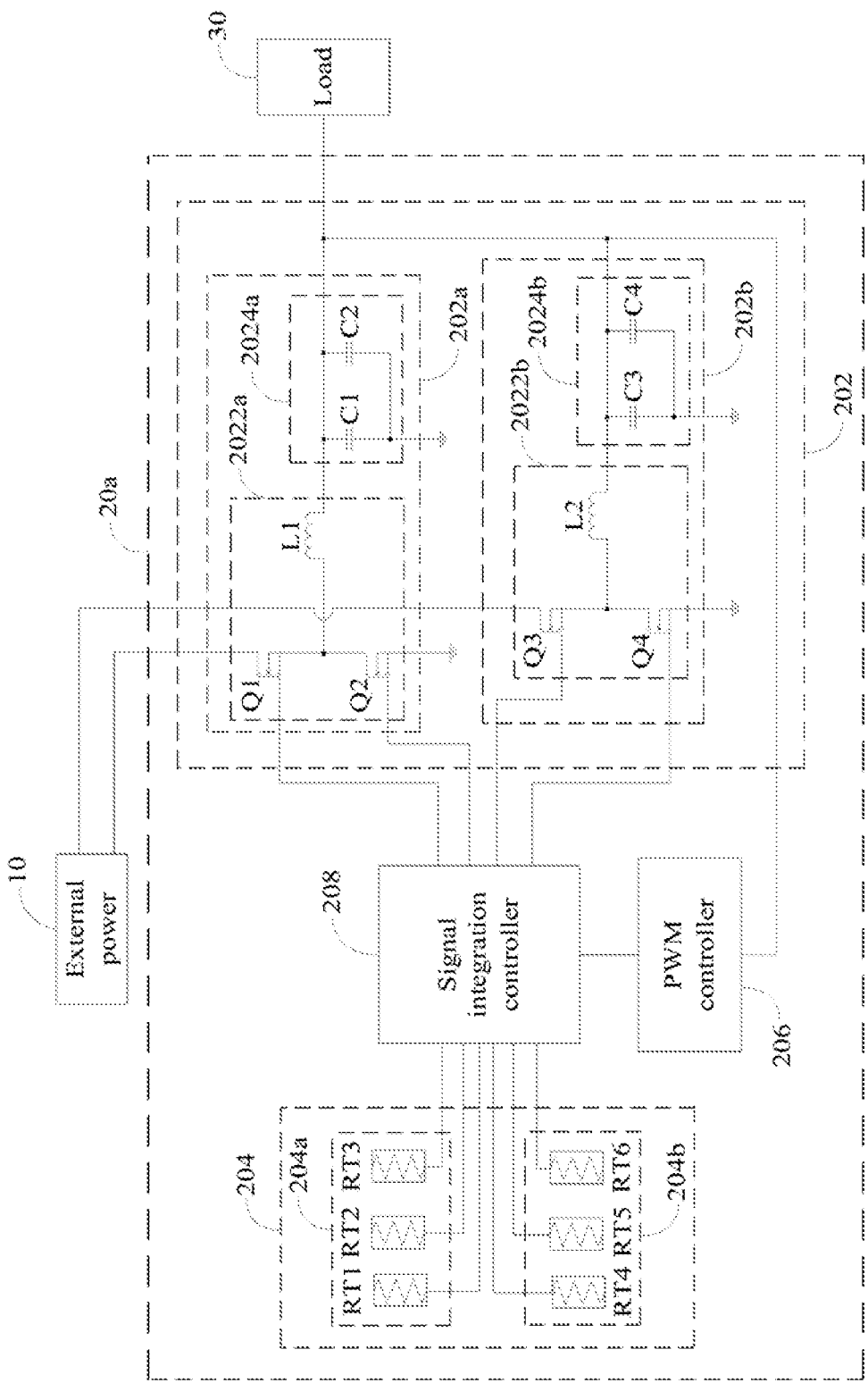
FIG. 2 is a circuit diagram of a second embodiment of a thermal balance conversion circuit according to the present disclosure.

FIG. 2 is a circuit diagram of a second embodiment of a thermal balance conversion circuit 20a according to the present disclosure. In one embodiment, the thermal balance conversion circuit 20a is similar to the thermal balance conversion circuit 20 of the first embodiment. The voltage conversion unit 202a comprises a first switch Q1, a second switch Q2, a first inductor L1, a first capacitor C1, and a second capacitor C2. The first switch Q1 and the second switch Q2 both comprise a first terminal, a second terminal, and a control terminal. The control terminal of the first switch Q1 is connected to the signal integration controller 208, the first terminal of the first switch Q1 is connected to the external power 10, and the second terminal of the first switch Q1 is connected to a first end of the first inductor L1. A second end of the first inductor L1 is connected to the load 30. The control terminal of the second switch Q2 is connected to the signal integration controller 208, the first terminal of the second switch Q2 is connected to a node between the first switch Q1 and the first inductor L1, and the second terminal of the second switch Q2 is grounded. A first end of the first capacitor C1 is connected to a node between the first inductor L1 and the load 30, and a second end of the first capacitor C1 is grounded. A first end of the second capacitor C2 is connected to a node between the first inductor L1 and the load 30, and a second end of the second capacitor C2 is grounded. The first switch Q1, the second switch Q2, and the first inductor L1, form a booster unit 2022a. The booster unit 2022a converts the DC voltage output by the external power 10. The first capacitor C1 and the second capacitor C2 form a filter unit 2024a, and the filter unit 2024a filters the converted DC voltage to output the driving voltage needed by the load 30.

In response to the first switch Q1 being turned on, the second switch Q2 is turned off, the first inductor L1 stores energy, and the DC voltage output by the external power 10 is transmitted to the load 30 via the first switch Q1, the first inductor L1, the first capacitor C1, and the second capacitor C2. In response to the second switch Q2 being turned on, the first switch Q1 is turned off, and the first inductor L1 is discharged to replace the external power 10 to supply power signals.

In one embodiment, the voltage conversion unit 202b comprises a third switch Q3, a fourth switch Q4, a second inductor L2, a third capacitor C3, and a fourth capacitor C4. The circuit diagram and operating principle of the voltage conversion unit 202b are similar to the circuit diagram and operating principle of the voltage conversion unit 202a.

In one embodiment, the first switch Q1, the second switch Q2, the third switch Q3, and the fourth switch Q4 can be a N type metal-oxide semiconductor field effect transistor (NMOSFET), a P type metal-oxide semiconductor field effect transistor (PMOSFET), a NPN type transistor, and a PNP type transistor.

Values of the driving voltage output by each of the voltage conversion units 202a, 202b are substantially equivalent, and phases of the driving voltage output by each of the voltage conversion units 202a, 202b are different.

In one embodiment, the voltage conversion circuit 202 comprises two voltage conversion units 202a, 202b. The phase difference between the voltage conversion unit 202a and the voltage conversion unit 202b is about 180 degrees. The voltage conversion circuit 202 can comprise three voltage conversion units. The phase difference between the voltage conversion unit 202a and the voltage conversion unit 202b is 120 degrees. The voltage conversion circuit 202 can also comprise four voltage conversion units. The phase difference between the voltage conversion unit 202a and the voltage conversion unit 202b is 90 degrees.

The circuit diagram and operating principle of the temperature detection unit 204a are similar to the circuit diagram and operating principle of the temperature detection unit 204b. The temperature detection unit 204a detects temperature of main elements in the voltage conversion unit 202a, and the temperature detection unit 204b detects temperature of main elements in the voltage conversion unit 202b.

In one embodiment, the main elements in the voltage conversion unit 202a comprises the first switch Q1, the second switch Q2, and the first inductor L1. The main elements in the voltage conversion unit 202b comprises the third switch Q3, the fourth switch Q4, and the second inductor L2.

In one embodiment, the temperature detection unit 204a comprises three temperature sensors RT1, RT2, RT3, the temperature detection unit 204b comprises three temperature sensors RT4, RT5, RT6, and each of the temperature sensors RT1, RT2, RT3 respectively detects temperature of the first switch Q1, the second switch Q2 and the inductor L1. Each of the temperature sensors RT1, RT2, RT3, RT4, RT5, RT6 can be a thermal resistor, a thermocouple, or other temperature detection module.

Figure 3:
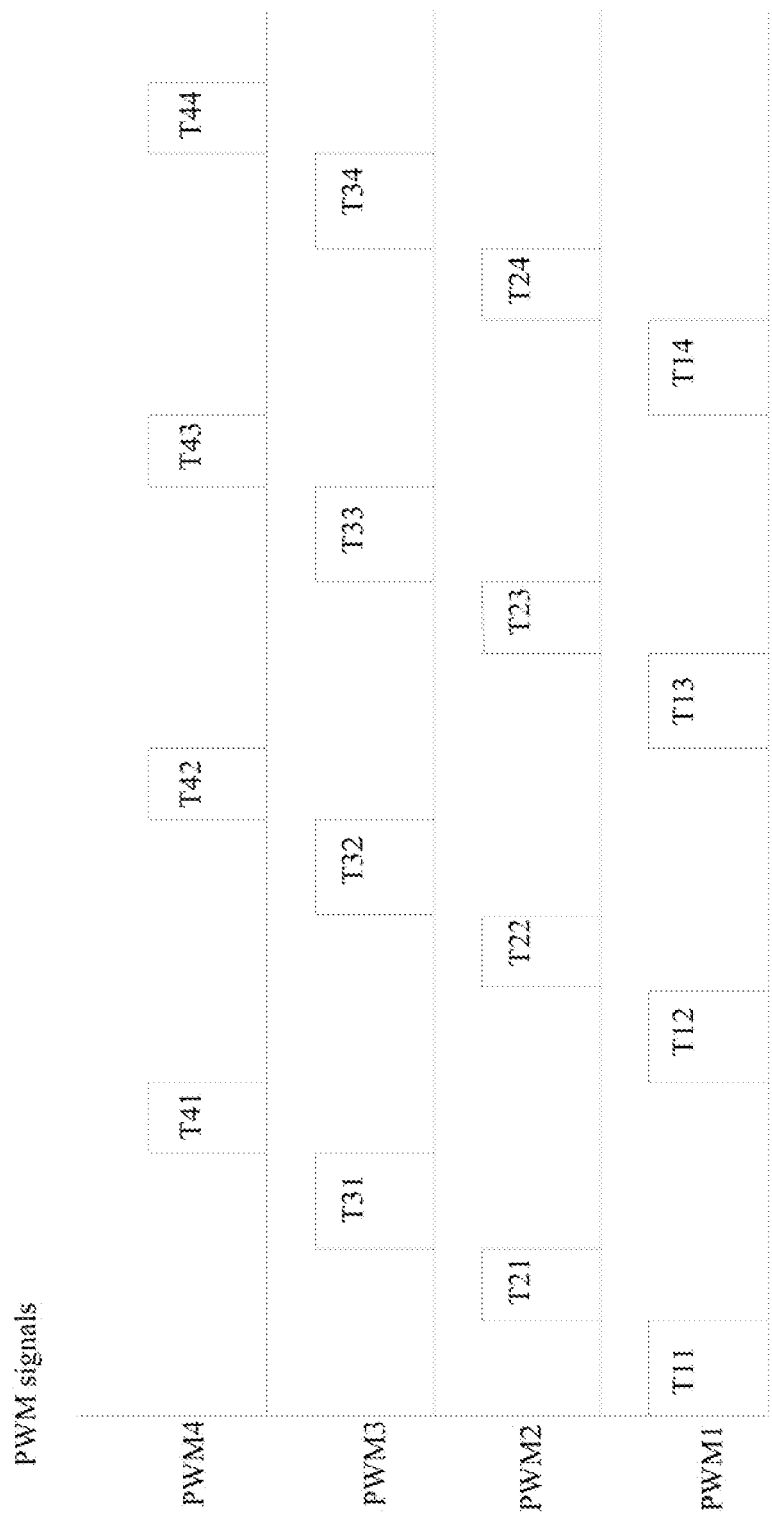
FIG. 3 is a waveform diagram of a plurality of PWM signals according to the present disclosure.

FIG. 3 is a waveform diagram of the plurality of PWM signals PWM1, PWM2, PWM3, PWM4 according to the present disclosure. In one embodiment, the PWM controller 206 outputs the plurality of different phase PWM signals PWM1, PWM2, PWM3, PWM4 (four shown). Each of the PWM signals PWM1, PWM2, PWM3, PWM4 correspondingly controls the first switch Q1, the second switch Q2, the third switch Q3, and the fourth switch Q4 turned on or off. The duty cycle of the PWM signals PWM1 is substantially equivalent to the duty cycle of the PWM signals PWM3, and the duty cycle of the PWM signals PWM2 is equivalent to the duty cycle of the PWM signals PWM4, to ensure the driving voltage output by the voltage conversion unit 202a is equivalent to the driving voltage output by the voltage conversion unit 202b. In other embodiments, the duty cycle of the PWM signals PWM1, PWM2, PWM3, PWM4 are substantially equivalent to each other.

In one embodiment, the PWM controller 206 slightly adjusts the duty cycle of the plurality of PWM signals PWM1, PWM2, PWM3, PWM4 according to the driving voltage output by the plurality of voltage conversion units 202a, 202b.

The signal integration controller 208 calculates a first mean temperature according to the detected temperatures of the temperature sensors RT1, RT2, RT3 and calculates a second mean temperature according to the detected temperatures of the temperature sensors RT4, RT5, RT6. The signal integration controller 208 generates the temperature signals corresponding to the voltage conversion unit 202a according to the first mean temperature, and generates the temperature signals corresponding to the voltage conversion unit 202b according to the second mean temperature. In one embodiment, the greater the value of the mean temperature, the greater the value of the temperature signals.

In response to the signal integration controller 208 determining none of the values of the plurality of temperature detection signals are greater than the predetermined threshold, the thermal balance conversion circuit 20a is working in a normal mode. The signal integration controller 208 correspondingly transmits the plurality of PWM signals PWM1, PWM2, PWM3, PWM4 received from the PWM controller 206 to the plurality of voltage conversion units 202a, 202b to control the first switch Q1, the second switch Q2, the third switch Q3, and the fourth switch Q4, to alternately turn on and turn off. In one embodiment, in response to the signal integration controller 208 controlling the first switch Q1 to turn on, the second switch Q2, the third switch Q3, and the fourth switch Q4 are turned off. In response to the signal integration controller 208 controlling the second switch Q2 to turn on, the first switch Q1, the third switch Q3, and the fourth switch Q4 are turned off. In response to the signal integration controller 208 controlling the third switch Q3 to turn on, the first switch Q1, the second switch Q2, and the fourth switch Q4 are turned off. In response to the signal integration controller 208 controlling the fourth switch Q4 to turn on, the first switch Q1, the second switch Q2, and the third switch Q3 are turned off.

In response to the signal integration controller 208 determining one or more of the values of the plurality of temperature detection signals are greater than the predetermined threshold, the thermal balance conversion circuit 20a is operating in a thermal balance adjusting mode. The signal integration controller 208 compares and finds the maximum value and the minimum value among the plurality of temperature detection signals. The signal integration controller 208 transfers the PWM signals PWM3, PWM4 of the voltage conversion unit 202b corresponding to the maximum value to the PWM signals PWM1, PWM2 of the voltage conversion unit 202a corresponding to the minimum value, and replaces the voltage conversion unit 202b corresponding to the maximum value with the voltage conversion unit 202a corresponding to the minimum value to convert the DC voltage.

In one embodiment, the unit cycle of the thermal balance conversion circuit 20a is the signal integration controller 208 controls the first switch Q1, the second switch Q2, the third switch Q3, and the fourth switch Q4 to respectively turn on one time.

Figure 4:
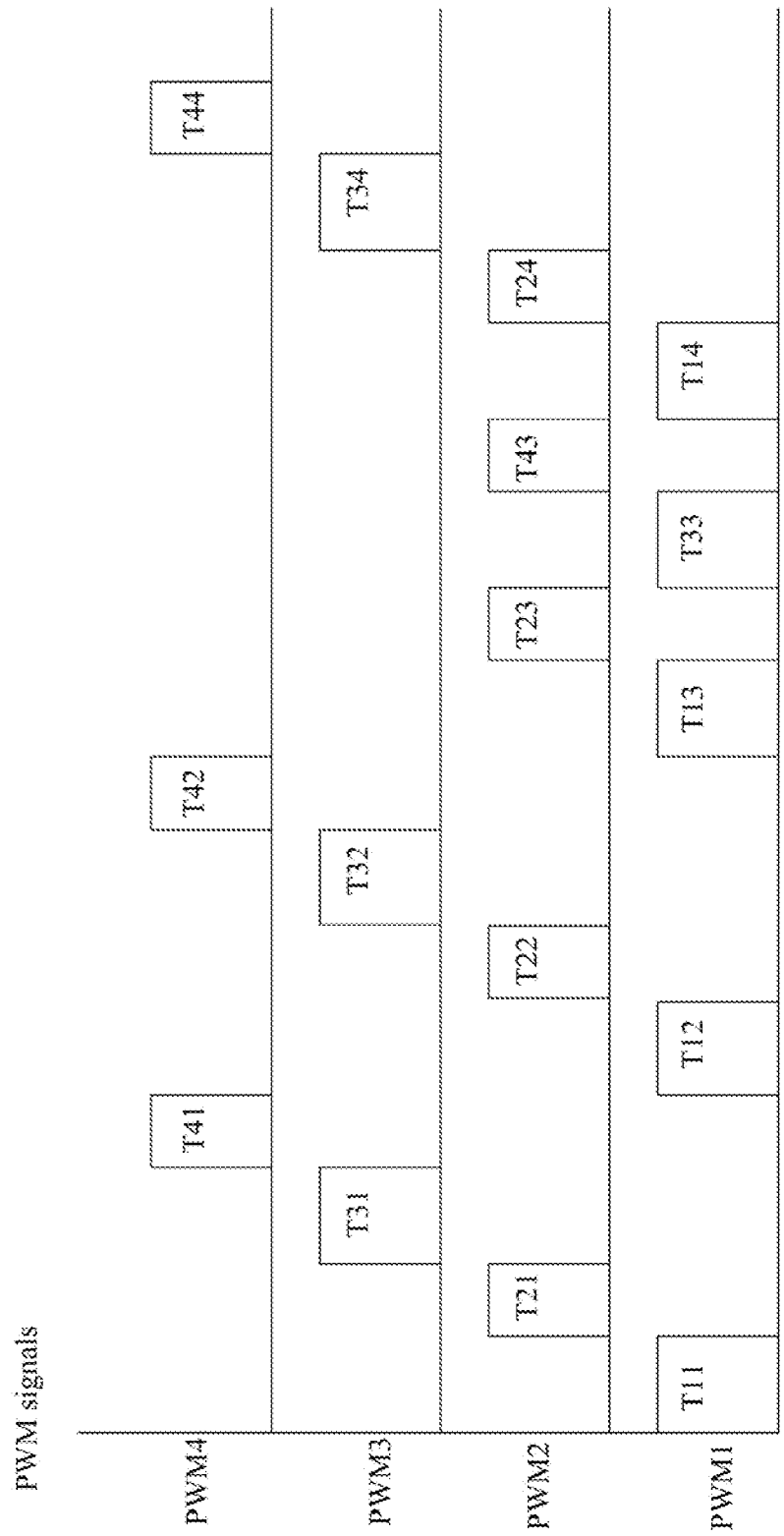
FIG. 4 is a adjusted waveform diagram of a plurality of PWM signals by a signal integration controller according to the present disclosure.

FIG. 4 is an adjusted waveform diagram of the plurality of PWM signals PWM1, PWM2, PWM3, PWM4 by the signal integration controller 208 according to the present disclosure. In one embodiment, the voltage conversion circuit 20a comprises two voltage conversion units 202a, 202b. The signal integration controller 208 transmits the PWM signals PWM1, PWM2 to the voltage conversion unit 202a, and transmits the PWM signals PWM3, PWM4 to the voltage conversion unit 202b. In one embodiment, in response to in a first unit cycle and a second unit cycle, the signal integration controller 208 determines none of the values of the plurality of temperature detection signals are greater than the predetermined threshold, the thermal balance conversion circuit 20a is working in a normal mode, and the voltage conversion units 202a, 202b convert the DC voltage in turn. In response to a third unit cycle, the PWM signals PWM1 are in a time point T13, and the PWM signals PWM2 are in a time point T23. The signal integration controller 208 determines one or more of the values of the plurality of temperature detection signals are greater than the predetermined threshold. In one embodiment, the value of the temperature detection signals corresponding to the voltage conversion unit 202b is greater than the predetermined threshold, and the value of the temperature detection signals corresponding to the voltage conversion unit 202a is less than the predetermined threshold. The signal integration controller 208 transfers the PWM signals PWM3 to the PWM signals PWM1, and transfers the PWM signals PWM4 to the PWM signals PWM2. The signal integration controller 208 cancels a time point T33 in the PWM signals PWM3 and adds the time point T33 in the PWM signals PWM1, and cancels a time point T43 in the PWM signals PWM4 and add the time point T43 in the PWM signals PWM2. Therefore, in the third unit cycle, the waveform of the PWM signals PWM3, PWM4 are null, and the voltage conversion unit 202a replaces the voltage conversion unit 202b to convert the DC voltage of the external power 10. This causes the temperature of the voltage conversion unit 202a to increase and the temperature of the voltage conversion unit 202b to decrease. In the third unit cycle, the voltage conversion unit 202a replaces the voltage conversion unit 202b to convert the DC voltage to balance the voltage conversion unit 202a and the voltage conversion unit 202b in a thermal balance state. In response to in a fourth unit cycle, the signal integration controller 208 also determines according to the aforementioned steps.

In response to the voltage conversion circuit 202 comprising more than two voltage conversion units 202a, 202b, the operating principle of thermal balance of the voltage conversion units 202a, 202b is similar to the above description.

Switch frequency of the thermal balance conversion circuit 20a is 20 kHZ-100 kHZ, and the thermal balance conversion circuit 20a can perform one thousand thermal balance adjustments per second. Therefore, each of the voltage conversion units 202a, 202b can be in a thermal balance state.

The foregoing disclosure of various embodiments has been presented for the purposes of illustration. It is not intended to be exhaustive or limited to the precise forms disclosed. Many variations and modifications of the embodiments described herein will be apparent to one of ordinary skill in the art in the light of the above disclosure. The scope is to be defined only by the claims appended hereto and their equivalents.

What is claimed is:

1. A thermal balance conversion circuit comprising:
   a voltage conversion circuit connected between an external power and a load, the voltage conversion circuit comprising a plurality of voltage conversion units, the plurality of voltage conversion units converting a direct current (DC) voltage of the external power to a driving voltage needed by the load;
   a temperature detection circuit comprising a plurality of temperature detection units, the plurality of temperature detection units respectively detecting temperatures of the plurality of voltage conversion units;
   a pulse width modulation (PWM) controller outputting a plurality of PWM signals in different phases corresponding to each of the voltage conversion units; and
   a signal integration controller connected to the voltage conversion circuit, the temperature detection circuit, and the PWM controller, the signal integration controller generating temperature detection signals corresponding to each of the voltage conversion units according to the temperature detection signals output by each of the temperature detection unit, comparing and finding a maximum value and a minimum value among the temperature detection signals in a unit cycle, transferring one of the plurality of the PWM signals of one of the plurality of the voltage conversion units corresponding to the maximum value to another one of the plurality of the PWM signals of another one of the plurality of the voltage conversion units corresponding to the minimum value and replacing the voltage conversion unit corresponding to the maximum value with the voltage conversion unit corresponding to the minimum value to convert the DC voltage of the external power;
   wherein the plurality of voltage conversion units converts the DC voltage of the external power to the driving voltage according to the plurality of PWM signals output by the signal integration controller.

2. The thermal balance conversion circuit of claim 1, wherein the voltage conversion circuit is further connected to the PWM controller, the PWM controller adjusts a duty cycle of the plurality of PWM signals according to the driving voltage output by each of the voltage conversion units, and sends the plurality of adjusted PWM signals to the signal integration controller to adjust the driving voltage output by the each of the voltage conversion units.

3. The thermal balance conversion circuit of claim 1, wherein the signal integration controller determines if values of the plurality of temperature detection signals are greater than a predetermined threshold, the signal integration controller correspondingly transmits the plurality of PWM signals to each of the voltage conversion units in response to none of the values of the temperature detection signals being greater than the predetermined threshold.

4. The thermal balance conversion circuit of claim 3, wherein in response to one or more of the values of the temperature detection signals being greater than the predetermined threshold, the signal integration controller compares and finds the maximum value and the minimum value among the temperature detection signals.

5. The thermal balance conversion circuit of claim 1, wherein each of the voltage conversion units comprises a booster unit converting the DC voltage of the external power, and a filter unit filtering the converted DC voltage to output the driving voltage.

6. The thermal balance conversion circuit of claim 5, wherein the booster unit comprises:
   a first switch with a first terminal connected to the external power, a second terminal connected to the load, and a control terminal connected to the signal integration controller;
   a second switch with a first terminal connected to a node between the first switch and the load, a second terminal grounded, and a control terminal connected to the signal integration controller; and
   an inductor connected between the second terminal of the first switch and the load.

7. The thermal balance conversion circuit of claim 6, wherein the filter unit comprises:
   a first capacitor with a first end connected to a node between the inductor and the load, and a second end grounded; and
   a second capacitor with a first end connected to a node between the inductor and the load, and a second end grounded.

8. The thermal balance conversion circuit of claim 6, wherein each of the temperature detection units detects temperatures of the first switch, the second switch, and the inductor.

9. The thermal balance conversion circuit of claim 8, wherein the signal integration controller calculates a mean temperature according to the temperatures of the first switch, the second switch, and the inductor, and the signal integration controller generates temperature detection signals corresponding to the voltage conversion unit according to the mean temperature.

10. The thermal balance conversion circuit of claim 8, wherein each of the temperature detection units comprises three temperature sensors, and each of the temperature sensors respectively detects the temperatures of the first switch, the second switch, and the inductor.

* * * * *